United States Patent
Heinrich

(10) Patent No.: US 12,311,983 B2
(45) Date of Patent: May 27, 2025

(54) METHOD FOR SWITCHING BETWEEN MANUAL AND AUTONOMOUS DRIVE, AND VEHICLE

(71) Applicant: VOLKSWAGEN AKTIENGESELLSCHAFT, Wolfsburg (DE)

(72) Inventor: Felix Heinrich, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 48 days.

(21) Appl. No.: 18/554,046

(22) PCT Filed: Apr. 12, 2022

(86) PCT No.: PCT/EP2022/059687
§ 371 (c)(1),
(2) Date: Oct. 5, 2023

(87) PCT Pub. No.: WO2022/218950
PCT Pub. Date: Oct. 20, 2022

(65) Prior Publication Data
US 2024/0367691 A1    Nov. 7, 2024

(30) Foreign Application Priority Data
Apr. 16, 2021 (DE) ............. 10 2021 203 818.2

(51) Int. Cl.
*B60W 50/10* (2012.01)
*B60W 60/00* (2020.01)
(Continued)

(52) U.S. Cl.
CPC ........ *B60W 60/0054* (2020.02); *B60W 50/10* (2013.01); *B60W 60/0051* (2020.02);
(Continued)

(58) Field of Classification Search
CPC ............... B60W 50/10; B60W 60/005; B60W 60/0051; B60W 60/0053; B60W 60/0054;
(Continued)

(56) References Cited

U.S. PATENT DOCUMENTS 9,753,459 B2    9/2017   Mueller
10,882,419 B2   1/2021   Wolf
(Continued)

FOREIGN PATENT DOCUMENTS

DE    102013019141 A1    5/2015
DE    102015206501 A1    10/2016
DE    102018005421 A1    1/2020

OTHER PUBLICATIONS

Jenny, DE 102018005421 (English translation), Jan. 9, 2020 (Year: 2020).*

(Continued)

*Primary Examiner* — Erick R Solis
(74) *Attorney, Agent, or Firm* — BARNES & THORNBURG LLP

(57) ABSTRACT

A method for switching between autonomous drive and manual drive of a transportation vehicle, wherein the driver of the transportation vehicle is observed by at least one interior camera relative to a handover intention and/or takeover intention. In response to a handover intention being detected, the steering wheel is moved away from the driver and the drive is switched to autonomous drive. In response to a takeover intention being detected, the steering wheel is moved toward the hands of the driver and the drive is switched to manual drive.

16 Claims, 2 Drawing Sheets

(51) Int. Cl.
  *B62D 1/183* (2006.01)
  *G06V 20/59* (2022.01)
(52) U.S. Cl.
  CPC ......... *B60W 60/0053* (2020.02); *B62D 1/183* (2013.01); *G06V 20/59* (2022.01); *G06V 20/597* (2022.01)
(58) Field of Classification Search
  CPC ... B60W 60/0055; B62D 1/183; G06V 20/59; G06V 20/597
  USPC ...................................................... 701/41, 44
  See application file for complete search history.

(56) References Cited

U.S. PATENT DOCUMENTS

| | | |
|---|---|---|
| 2016/0303972 A1 | 10/2016 | Kühne |
| 2016/0357186 A1 | 12/2016 | Dias |
| 2016/0362117 A1* | 12/2016 | Kaufmann ............... B62D 1/04 |
| 2016/0375925 A1* | 12/2016 | Lubischer ............... B62D 1/183 |
| | | 701/41 |
| 2018/0154932 A1* | 6/2018 | Rakouth ............... B62D 1/286 |
| 2019/0073546 A1 | 3/2019 | Aoi et al. |
| 2019/0118849 A1 | 4/2019 | Cazzoli |
| 2019/0204841 A1* | 7/2019 | Luo ...................... G05D 1/0214 |
| 2020/0269900 A1 | 8/2020 | Kawaguchi |
| 2020/0339176 A1* | 10/2020 | Cao ........................ B62D 1/183 |
| 2021/0107527 A1 | 4/2021 | Karve |
| 2021/0124349 A1* | 4/2021 | Koehler ................. B62D 1/185 |
| 2021/0387644 A1* | 12/2021 | Haban ................. B60R 13/0256 |
| 2022/0185337 A1* | 6/2022 | Ming ................. B60W 60/0057 |
| 2022/0274639 A1* | 9/2022 | Park ....................... B62D 1/183 |
| 2022/0332331 A1* | 10/2022 | Ming .................... B60R 16/033 |
| 2024/0300566 A1* | 9/2024 | Cimatti ................. B62D 1/183 |

OTHER PUBLICATIONS

International Search Report; International Patent Application No. PCT/EP2022/059687; Aug. 3, 2022.

* cited by examiner

METHOD FOR SWITCHING BETWEEN MANUAL AND AUTONOMOUS DRIVE, AND VEHICLE

PRIORITY CLAIM

This patent application is a U.S. National Phase of International Patent Application No. PCT/EP2022/059687, filed 12 Apr. 2022, which claims priority to German Patent Application No. 10 2021 203 818.2, filed 16 Apr. 2021, the disclosures of which are incorporated herein by reference in their entireties.

SUMMARY

Illustrative embodiments relate to a method for switching between autonomous drive and manual drive of a transportation vehicle, in which method the driver of the transportation vehicle is observed by at least one interior camera in terms of handover intention and/or takeover intention. If a handover intention is detected, the steering wheel is moved away from the driver and the drive switched to autonomous drive. If a takeover intention is detected, the steering wheel is moved towards the hands of the driver and the drive is switched to manual drive.

BRIEF DESCRIPTION OF THE DRAWINGS

Disclosed embodiments are explained in detail below with reference to the drawings, in which.

DETAILED DESCRIPTION

Figure 1:
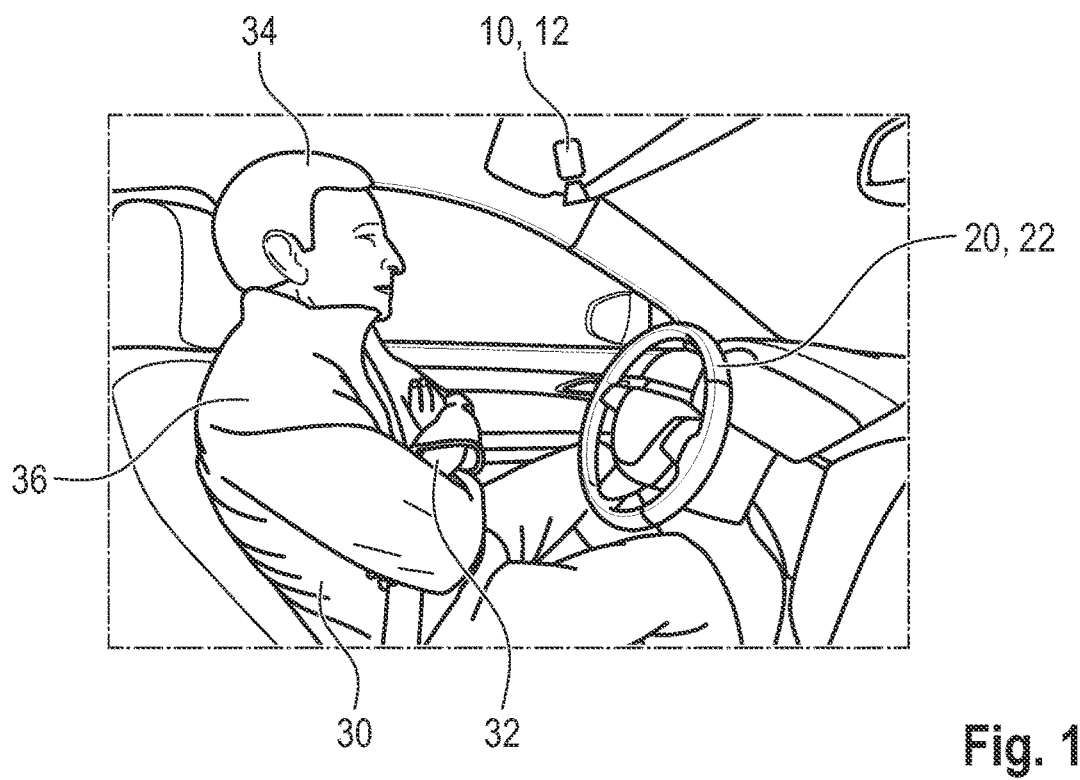
FIG. 1 shows a driver in the case of autonomous drive in a transportation vehicle.

Autonomous driving permits the driver of a transportation vehicle to utilize the travel time in other ways, for example, for working, for relaxing or for sleeping. It is often desirable to move the steering wheel out of the use position into a different position, as far away as possible from the driver. To this end, a large number of solutions have already been developed. However, during autonomous drive it can be necessary or desirable to switch back to manual drive, i.e., to the control of the transportation vehicle by the driver. This can firstly be based simply on the request of the driver, but can also be initiated by the driver in critical situations. Then the steering wheel firstly has to move back within reach of the driver, and secondly the switching from autonomous drive to manual drive has to be completed.

For switching between the aforementioned drive modes, generally a dedicated operating action is required by the driver, i.e., the driver has to trigger the switching of the drive modes by actuating an operating element or the like. This is inconvenient, primarily for switching into manual drive, when the operating element is provided in the region of the dashboard of the transportation vehicle and the driver has displaced their seating position to the rear during autonomous drive. Secondly, the actuation of an operating element can cost valuable time when the drive is to be handed over to the driver due to a critical driving situation, and the driver first has to actuate the operating element to move the steering wheel in their direction and to switch the drive mode.

It would be beneficial, therefore, if both the movement of the steering wheel and the switching of the drive mode could be switched independently of an operating element.

Disclosed embodiments propose a solution as to how it is possible to switch between autonomous and manual drive without the driver of the transportation vehicle actuating an operating element, wherein the steering wheel is moved into a position suitable for drive mode. This should be possible both for switching from autonomous to manual drive and vice versa.

Disclosed embodiments provide a method and a transportation vehicle.

In the disclosed method for switching between manual drive and autonomous drive in a transportation vehicle, at least one interior camera in the transportation vehicle detects at least the hands of a driver of the transportation vehicle. On the basis of a hand movement, a takeover intention and/or a handover intention of a driver of the transportation vehicle is detected by image analysis. When a takeover intention is detected, the steering wheel is moved in the direction of the hands of the driver and the drive is switched to manual drive and/or when a handover intention is detected, the steering wheel is moved away from the driver and the drive is switched to autonomous drive.

The method is thus intended to permit switching between manual drive and autonomous drive, wherein the position of the steering wheel is suitably set for drive mode. As already explained, manual drive is a drive in which the driver of the transportation vehicle controls the transportation vehicle. Autonomous drive is a drive in which the driver does not intervene in the control of the transportation vehicle. The two driving styles are also denoted hereinafter as drive modes.

To switch between drive modes without an operating element having to be actuated, at least one interior camera in the transportation vehicle observes at least the hands of the driver. The interior camera is thus designed such that the hands of the driver are located in the field of view of the camera. It can be beneficial if not only the hands but also other areas of the driver, such as, for example, the arms, the face or the whole upper body, are detected by the at least one interior camera, as will be explained in more detail elsewhere.

The at least one interior camera can be a camera which is provided separately for carrying out the method or a camera which is already provided in the transportation vehicle for other tasks but can be additionally used for the disclosed method. The method can also be carried out with more than one camera provided at different positions in the transportation vehicle, to obtain an improved overview of the movement of the hands of the driver or optionally other areas of the (body) of the driver.

The detection of at least the hands of the driver can be carried out continuously but also at predefined time intervals. The recordings detected by the at least one interior camera are evaluated continuously by suitable image analysis, whether a hand movement of the driver enables the identification of a takeover intention for switching to manual drive and/or a handover intention to autonomous drive. Thus it is monitored or detected by image analysis whether in autonomous drive the driver moves, for example, the hands from a resting position in the direction of the steering wheel, optionally performs a gripping movement and thereby signals that they wish to take over the steering and to switch to manual drive. If in manual drive, for example, the driver places the hands in their lap or picks up an object, such as, for example, a drinking bottle, this can indicate the intention to hand over the drive to autonomous mode. The term "hand movement" encompasses the movement with one or both hands. A hand movement is determined, amongst other things, from the position of one hand or both hands, the distance of one hand or both hands from the steering wheel or its usual position, the direction of movement of one hand or both hands and/or the speed of movement of one hand or both hands. The hand movement can be arbitrary or involuntary.

For the image analysis itself, reference can be made to the methods known per se. For example, these include methods for pattern recognition and artificial neural networks.

If the hand movement of the driver allows it to be inferred that switching to manual drive is to be carried out, i.e., a takeover intention, the steering wheel is moved in the direction of the hands of the driver, i.e., toward the driver and thus further in the direction of the transportation vehicle interior, on the assumption that in autonomous drive the steering wheel was arranged in a position remote from the driver. The movement of the steering wheel can be carried out, for example, by electric motors which permit an electrical steering column adjustment.

Moreover, the drive mode is switched, i.e., the transportation vehicle switches from autonomous drive mode into manual drive mode in which the driver has control of the transportation vehicle. The switching of the drive mode may take place when the driver can grip the steering wheel or at least can almost grip the steering wheel while it is being moved toward the driver. Thus it is ensured that even though the driver cannot yet grip the steering wheel the transportation vehicle does not travel forward uncontrolled. At the same time, valuable time is saved since the driver can take over the drive immediately upon contact with the steering wheel.

If a handover intention of the driver is detected by the image analysis, i.e., the wish of the driver to switch to autonomous drive, the steering wheel is moved away from the driver or the hands of the driver so that the driver has more space for their activities during autonomous drive and thus enjoys more comfort. Additionally, the drive mode is switched to autonomous driving as soon as the steering wheel is moved away from the driver so that the transportation vehicle never travels forward uncontrolled.

The position into which the steering wheel is moved with a handover intention can also be denoted as the resting position, while the position with active operation of the steering wheel can be denoted as the driving position. The resting position of the steering wheel can be achieved by the steering wheel being lowered or stowed in the dashboard of the transportation vehicle.

The method can be designed to act only with a handover intention or only with a takeover intention, or for both. In the latter case, the reaction of the transportation vehicle in each case results according to the detected intention.

A first exemplary embodiment of the disclosed method provides that the driver is signaled as to whether a detection of a handover intention and/or a takeover intention has taken place. The driver is thus to be informed whether a hand movement has taken place which triggers a switching of the drive mode. Such a indication can be beneficial to impart to the driver a feeling of safety when it is indicated to them that the switching intention has been successfully identified, specifically in critical situations where the driver might wish to switch to manual drive. This is expedient even in the reverse case, since the driver can be certain that the transportation vehicle does not travel forward uncontrolled when the steering wheel is released.

This disclosed embodiment is of particular use when a hand movement of the driver cannot be clearly detected or evaluated so that a reliable detection of an intention of the driver cannot take place, whereby additionally the position of the steering wheel and the drive mode could not or would not be switched. In this case, it is possible to provide a signal which informs the driver that their switching intention was not able to be reliably assigned, so that, for example, the hand movement can be repeated or the intended switching can be manually confirmed by an operating element. This also intercepts movements which the driver, for example, makes involuntarily, i.e., without intending to switch the drive modes.

The signaling as to whether a handover intention and/or a takeover intention has been detected can be implemented acoustically and/or visually. An acoustic signal can be a tone or a tone sequence, such as are used, for example, in computers for indicating a successful or failed action, or can comprise a warning tone or a warning tone sequence when the switching has not been successfully identified and cannot be carried out. A visual signal can be an illumination of a warning lamp, a rear-lit symbol in the display region of the dashboard, a verbal and/or pictorial confirmation on a display device of the transportation vehicle, such as, for example, a display or the like.

As already explained, the at least one interior camera can be an interior camera of the transportation vehicle which is separately provided or is already present. Optionally, at least one interior camera is used, the camera being arranged above the windshield, in or on a mirror, in or on an interior lighting unit or in the roof of the transportation vehicle.

The region above the windshield is not limited in a direction transversely to the direction of travel. In other words, the at least one camera can be positioned anywhere along the entire width of the windshield, if it can detect at least the hands of the driver. The at least one interior camera can be arranged on or in the rear-view mirror, where a clear overview is present of the movements of the hands of the driver and optionally other switching indicators and at the same time the media connections in the region of the rear-view mirror can be additionally used.

The at least one interior camera can, however, also be arranged in or on a reading light, an ambient lighting or the like and oriented in the direction of the hands of the driver. An arrangement of the at least one interior camera on or in the roof lining of the transportation vehicle, thus on or in the roof of the transportation vehicle, is also suitable for detecting the hand movement of the driver.

If the method is carried out with more than one camera, the arrangement thereof at different positions proves beneficial, primarily when the fields of view and/or orientations thereof are selected such that the hand movement of the driver can be detected from different perspectives. This increases the accuracy in the detection of the switching intention of the driver.

Any camera can be used for the at least one interior camera, in particular, a stereo camera, a thermal imaging camera or a time-of-flight camera. Since a stereo camera permits the creation of a three-dimensional image by two half images, hand movements of the driver can be clearly and thus reliably evaluated. Time-of-flight cameras (TOF cameras) are cameras which achieve a three-dimensional rendition of a recorded region by run-time methods and thus also permit a clearer evaluation of the hand movements of the driver. A thermal imaging camera proves beneficial since it records thermal radiation and thus the detection of at least the hands of the driver is not impaired by reflections and dazzling situations.

A further exemplary embodiment of the disclosed method is provided when further indicators for a takeover intention and/or handover intention are detected by the at least one interior camera, in particular, this can be a gesture of the driver, a viewing direction of the driver and/or a movement of the upper body of the driver. Further signs are to be detected in addition to a hand movement of the driver which enables a takeover intention and/or a handover intention to be inferred. To this end, further areas of the body of the driver are detected by the at least one camera and evaluated by image analysis. This detection, however, can also be implemented by further interior cameras.

Further indicators for a takeover intention and/or a handover intention can be, for example, gestures as a particular exemplary embodiment of a hand movement. This is to be understood to mean repeatable hand movements which are intentionally carried out and which in each case are assigned to a handover intention or a takeover intention. Such gestures can be limited to the use of one hand or can require the use of both hands. The gestures can be predetermined as predefined gestures relative to the transportation vehicle and/or as user-defined gestures previously fixed by the driver. If such a gesture is detected by the at least one interior camera and identified by the image analysis, the takeover intention or the handover intention is clearly transmitted to the transportation vehicle so that the steering wheel can be moved immediately into the corresponding position and the drive mode can be switched.

A further indicator can be a viewing direction of the driver. This can be determined on the basis of the position and orientation of the head or directly derived from the recording of the at least one interior camera by image analysis. If, for example, a takeover intention is detected from a hand movement and the driver does not look in the direction of travel but, for example, to a co-driver, a handover to manual drive is potentially associated with risks, since the driver does not have a view of the traffic. Thus, in spite of the identified handover intention, it might be expedient in such a situation not to undertake switching of the drive mode or adjustment of the steering wheel, and/or to indicate a conflict between the detected hand movement and the detected viewing direction by a warning.

The detection and analysis of the viewing direction of the driver can permit conclusions to be made as to whether the hand movement was potentially only performed involuntarily and thus there was no actual handover or takeover intention. The viewing direction as a further indicator is thus also to be understood as a verification for the hand movement of the driver.

Alternatively or additionally, a movement of the upper body of the driver can serve as a further indicator for a takeover intention or handover intention. Thus a straightening of the upper body coinciding with a hand movement indicating a takeover intention can serve as confirmation of a desire for a takeover. Similarly, leaning back into a reclining position after a hand movement, which enables a handover intention to be inferred, could confirm this. As with an analysis of the viewing direction, the analysis of an upper body movement of the driver enables an estimation as to whether an inadvertent hand movement has been detected or whether there is an actual desire to switch the drive modes since, for example, a takeover of manual drive while the driver is in the reclining position is either not possible safely or has intentionally not been indicated.

An important application of the disclosed method is the takeover of the transportation vehicle and the switching to manual drive, in particular, in critical situations. Thus when a takeover intention is detected, it might be expedient if the steering wheel is initially moved rapidly and then more slowly in the direction of the hands of the driver when approaching the driving position. The purpose thereof is to reduce to a minimum the distance between the hands of the driver and the steering wheel as rapidly as possible and only to use a reduced speed in the last part of the movement of the steering wheel when adjusting the steering wheel, to permit the driver comfortable contact with the steering wheel.

"Rapidly" can mean, on the one hand, that the movement of the steering wheel is carried out at the highest possible speed, for example, during the adjustment of the steering column, i.e., at least a high speed, but on the other hand this is above all a relative indication compared to the significantly slower movement just before the hands of the driver come into contact with the steering wheel.

Optionally, the rapid movement can take place over half the distance to be covered by the movement of the steering wheel, further optionally over 60% and even further optionally over 70%.

To facilitate the takeover of the drive or the gripping of the steering wheel which is moved toward the driver, it is expedient if the steering wheel is moved to a driver-specific predetermined position when a takeover intention is detected. Thus the steering wheel is not simply to be moved from its resting position and in the direction of the transportation vehicle interior but into a position in which the driver can easily reach the steering wheel and to which the driver is accustomed. In the simplest case, this corresponds to the position of the steering wheel of a previous manual drive. If a change of driver has taken place in the meantime, however, the usual or desired steering wheel position can differ. Thus the driver and their preferred steering wheel position are to be correlated with one another, so that the driving position of the steering wheel can be individually set using the driver identity when a takeover intention is detected. The driver identity can be determined, for example, by way of the vehicle key which is used or by image recognition.

In an alternative exemplary embodiment of the method, when a takeover intention is detected on the basis of the position of the hands of the driver and/or the direction of movement of the hands of the driver, a probable contact position of the hands of the driver with the steering wheel is determined and the steering wheel is moved to the probable contact position.

The position and/or the direction of movement of the hands of the driver when indicating the takeover intention is known by the detection by the at least one interior camera and the subsequent image analysis. Thus it can be calculated or at least estimated, for example, by a suitable computer unit, where the hands of the driver are moving and at which time they are in which position. The predicted or probable position and/or direction of movement of the hands of the driver can be compared with the possible directions of movement and/or the possible speed of movement of the steering wheel, so that it is possible to determine a probable contact position at which the hands of the driver come into contact with the steering wheel.

An arbitrary driving position or a driver-specific driving position of the steering wheel is thus not set here, but a driving position which permits the most rapid contact of the hands of the driver with the steering wheel. This can be based on and adapted to the known driving positions, however, in particular driver-specific driving positions of the steering wheel.

It can be beneficial if the movement of the steering wheel is stopped when touched by the driver. Nowadays, it can usually be detected whether the steering wheel is touched by the driver. Different techniques and methods are known therefor. Irrespective of the selected detection of contact with a steering wheel, the movement of the steering wheel is to be stopped in the direction of the hands of the driver when such a contact is established. This applies both during the movement of the steering wheel into the resting position and into the driving position, since in both cases there are situations in which a stoppage of the steering wheel movement is applied.

If the steering wheel is moved, for example, into a resting position since switching to autonomous drive is to take place, and then a critical traffic situation occurs, the movement of the steering wheel can be interrupted by contact and the driver can grip the steering wheel to take control of the situation. When extending the steering wheel into the driving position it can arise that the driver moves their hands more rapidly than estimated and/or prefers a different driving position at that moment. In both cases, a further movement of the steering wheel in the direction of the driver is not desirable or is counterproductive. Thus in this case the movement can be terminated by contact with the steering wheel. A subsequent adaptation of the driving position is not ruled out thereby.

In addition to the disclosed method, a transportation vehicle is claimed which can be driven autonomously and which is configured and designed to carry out the disclosed method. To this end, such a transportation vehicle should have at least one interior camera which detects at least the hands of the driver, a device for processing and analyzing the recordings detected by the at least one interior camera and a control device which triggers the adjustment of the steering wheel and the switching of the drive mode on the basis of the results of the image analysis.

With the disclosed method and a transportation vehicle which is configured for the implementation thereof, it is possible by a hand movement to switch the drive mode of a transportation vehicle and to trigger the movement of the steering wheel into a position which is adapted to the drive mode. Switching from autonomous drive to manual drive and vice versa is simply possible without first having to actuate operating elements. This enhances the comfort during the journey and, in particular, when switching to manual drive, shortens the handover time until the driver has control of the transportation vehicle.

The various exemplary embodiments mentioned in this application are able to be combined together, unless stated otherwise in individual cases.

FIG. 1 shows a driver 30 in a transportation vehicle 50 reclining with crossed arms. The steering wheel 20 is located in a position which is remote from the driver and which is denoted as the resting position 22. The steering wheel 20 is moved to this position when it is not to be used during autonomous drive. A stereo camera 10 which is designed to detect at least the hands 32 of the driver 30 is arranged above the steering wheel 20 and the windshield of the transportation vehicle (position 12).

Figure 2:
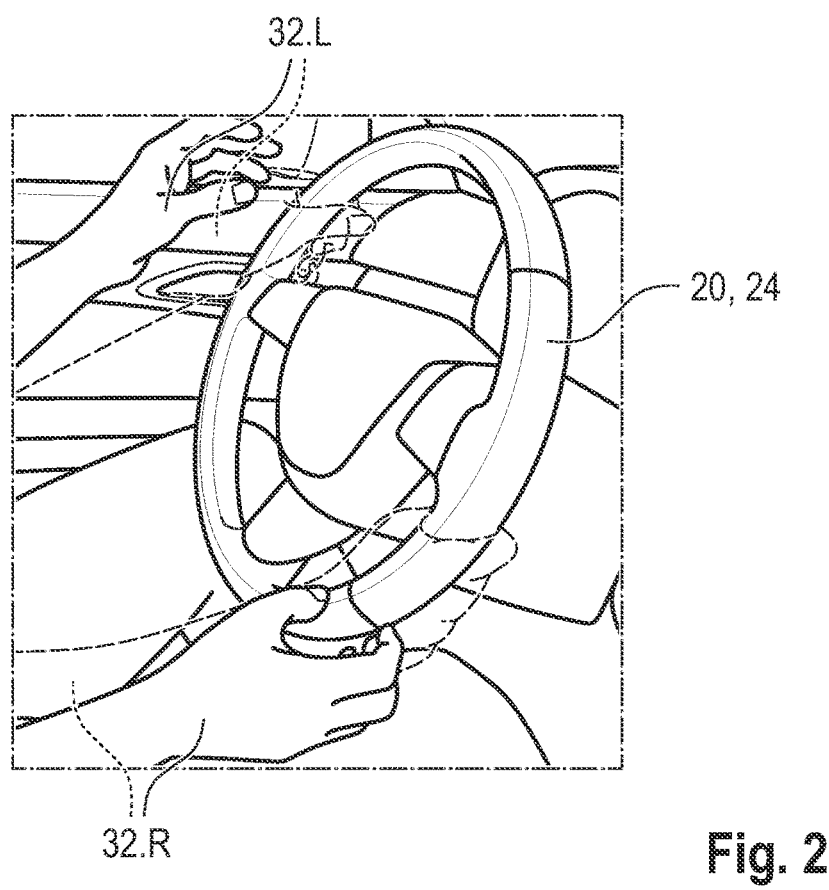
FIG. 2 shows the hands of the driver when a takeover intention is indicated.

On the basis of the recordings of the hands 32 of the driver, the hand movements thereof can be analyzed and it can be identified therefrom whether the driver would like to take over the transportation vehicle 50, i.e., would like to switch to manual drive. To indicate this, as shown in FIG. 2, the driver can reach in the direction of the steering wheel 20. For illustration, both hands 32 are shown in different gripping states 32.R and 32.L. As soon as this gripping movement is detected on the basis of the recordings of the at least one interior camera 10 and the subsequent image analysis, the steering wheel 20 is moved out of the resting position 22, according to FIG. 2, toward the driver 30 into the driving position.

The movement of the steering wheel 20 takes place at an increased speed over the first 70% of the distance which the steering wheel 20 has to cover, to reduce the distance between the steering wheel 20 and the hands 32 of the driver 30 as rapidly as possible. Over the remaining 30% of the distance to be covered, the steering wheel 20 is moved more slowly into the final driving position 24 so that the driver 30 can grip the steering wheel 20 pleasantly and comfortably. Additionally, the drive is switched to manual drive as soon as the hands 32 are almost able to grip the steering wheel 20.

If the hands 32 of the driver 30 reach the steering wheel 20 before the targeted driving position 24 thereof, the movement of the steering wheel 20 is stopped so that the movement of the steering wheel 20 does not act against the movement of the driver 30.

The driving position 24 of the steering wheel 20 can selectively be a driver-specific predetermined position which is approached by the steering wheel 20 in the knowledge of the currently acting driver 30 when a takeover intention is signaled, or it can be individually determined. To this end, on the basis of the position of the hands 32 of the driver 30, the direction of movement and speed of movement thereof are estimated, when and where the hands will be and when and where they could grip the steering wheel 20. This probable contact position is then approached by the steering wheel 20 as the driving position 24.

If the driver 30 now places their hands 32 in their lap or crosses them, as in FIG. 2, this is also detected by the at least one interior camera 10 and, after the image analysis, is identified as a handover intention. Accordingly, the steering wheel 20 is then moved into the resting position 22 and the drive mode is switched to autonomous drive.

To indicate to the driver 30 that their takeover intention or their handover intention has been identified, the success or failure of the detection is shown on a display by symbols in the region of the dashboard of the transportation vehicle 50. Optionally, an acoustic signal can additionally signal the success or failure.

Figure 3:
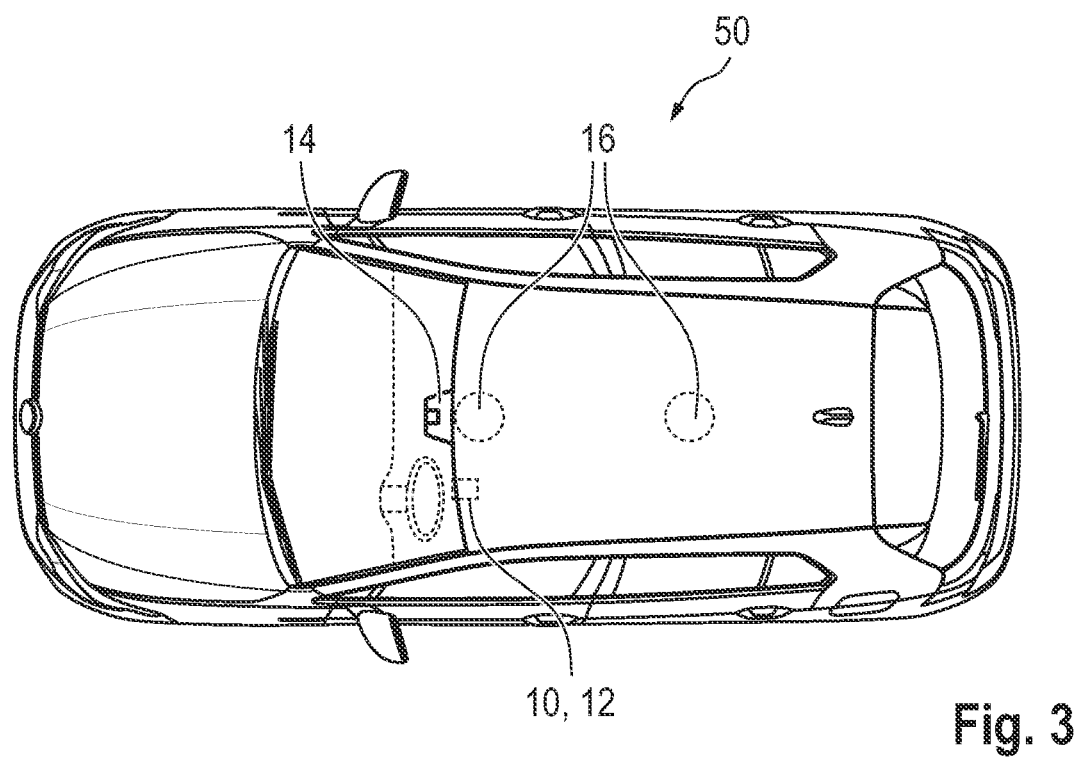
FIG. 3 shows possible positions of the interior camera for detecting the driver.

Alternative positions for the arrangement of the at least one interior camera 10 or optionally further cameras can be seen in FIG. 3. In addition to the position 12 above the windshield, interior camera(s) can be arranged on or in the rearview mirror 14 and/or on or in an interior lighting unit 16 of the transportation vehicle 50 and oriented toward the driver 30.

To ensure that an inadvertent hand movement does not accidentally trigger a switching of the drive mode, in addition to the hands 32 of the driver 30, also the upper body 36 and the position and orientation of the head 34 are detected by the interior camera 10 or a further camera which is optionally present (not shown). Using the image analysis it can be identified whether the driver 30 is looking forward in the direction of travel when a detected hand movement enables a takeover intention to be inferred. If this is the case, there is nothing to hinder the switching of the drive mode to manual drive and a movement of the steering wheel 20 into the driving position 22. If the driver 30 is not looking to the front or their eyes are closed, however, the switching is not completed and a warning tone sounds.

In the same way, the position of the upper body 36 of the driver 30 is evaluated. If this upper body is leaning back or even reclined, it is unlikely that a takeover of the drive is desired.

LIST OF REFERENCE NUMERALS

10 Interior camera
12 Position above windshield
14 Rear-view mirror
16 Interior lighting unit
20 Steering wheel
22 Resting position of steering wheel
24 Driving position of steering wheel
30 Driver
32 Hand of driver
34 Head of driver
36 Upper body of driver
50 Transportation vehicle

The invention claimed is:

1. A method for switching between manual drive and autonomous drive modes in a transportation vehicle, the method comprising:
   detecting at least hands of a driver of the transportation vehicle by at least one interior camera in the transportation vehicle;
   detecting a takeover intention and/or a handover intention of a driver of the transportation vehicle based on hand movement-detected by image analysis;
   in response to a handover intention being detected, the steering wheel is moved away from the driver and the transportation vehicle is switched to the autonomous drive mode; and
   in response to a takeover intention being detected, the steering wheel is moved away from a resting position associated with the autonomous drive mode in a direction towards the hands of the driver to a driver specific driving position associated with the manual drive mode and the transportation vehicle is switched to the manual drive mode,
   wherein the movement of the steering wheel from the resting position is initially performed moved rapidly in a first phase that includes movement of the steering wheel and simultaneous movement of a steering column of the transportation vehicle and then more slowly in a second phase in the direction toward the hands of the driver when approaching the driver specific driving position, wherein the transition from the first phase to the second phase of movement is based on a relative distance between the steering wheel and the driver's hands.

2. The method of claim 1, further comprising signaling the driver as to whether a detection of a handover intention and/or a takeover intention has taken place.

3. The method of claim 1, wherein the interior camera is a camera above the windshield in or on a mirror of the transportation vehicle, in or on an interior lighting unit or a camera in the roof of the transportation vehicle.

4. The method of claim 1, wherein the interior camera is a stereo camera, a thermal imaging camera or a time-of-flight camera.

5. The method of claim 1, further comprising detecting further indicators for the takeover intention and/or the handover intention by the at least one interior camera including at least one of a gesture of the driver, a viewing direction of the driver, and/or a movement of the upper body of the driver.

6. The method of claim 1, wherein, in response to a takeover intention being detected, the steering wheel is moved to a driver-specific predetermined position determined based on a vehicle key used to operate the transportation vehicle.

7. The method of claim 1, further comprising determining a probable contact position of the hands of the driver with the steering wheel and the steering wheel is moved to the probable contact position in response to a takeover intention being detected based on the position of the hands of the driver and/or the direction of movement of the hands of the driver.

8. The method of claim 1, wherein the movement of the steering wheel is stopped when touched by the driver.

9. A transportation vehicle configured to be driven autonomously or manually, wherein switching between manual drive and autonomous drive modes of the transportation vehicle is performed by:
   detecting at least hands of a driver of the transportation vehicle by at least one interior camera in the transportation vehicle;
   detecting a takeover intention and/or a handover intention of a driver of the transportation vehicle based on hand movement detected by image analysis performed by a computer processing unit of image data provided by the at least one interior camera;
   in response to a handover intention being detected, the steering wheel is moved away from the driver and the transportation vehicle is switched to the autonomous drive mode; and
   in response to a takeover intention being detected, the steering wheel is moved away from a resting position associated with the autonomous drive mode in a direction towards the hands of the driver to a driver specific driving position associated with the manual drive mode and the transportation vehicle is switched to the manual drive mode,
   wherein the movement of the steering wheel from the resting position is initially performed moved rapidly in a first phase that includes movement of the steering wheel and simultaneous movement of a steering column of the transportation vehicle and then more slowly in a second phase in the direction toward the hands of the driver when approaching the driver specific driving position, wherein the transition from the first phase to the second phase of movement is based on a relative distance between the steering wheel and the driver's hands.

10. The transportation vehicle of claim 9, the driver is signaled as to whether a detection of a handover intention and/or a takeover intention has taken place.

11. The transportation vehicle of claim 9, wherein the interior camera is a camera above the windshield in or on a mirror of the transportation vehicle, in or on an interior lighting unit or a camera in the roof of the transportation vehicle.

12. The transportation vehicle of claim 9, wherein the interior camera is a stereo camera, a thermal imaging camera or a time-of-flight camera.

13. The transportation vehicle of claim 9, wherein further indicators for the takeover intention and/or the handover intention are detected by the at least one interior camera including at least one of a gesture of the driver, a viewing direction of the driver, and/or a movement of the upper body of the driver.

14. The transportation vehicle of claim 9, wherein, in response to a takeover intention being detected, the steering wheel is moved to a driver-specific predetermined position determined based on a vehicle key used to operate the transportation vehicle.

15. The transportation vehicle of claim 9, wherein a probable contact position of the hands of the driver with the steering wheel is determined and the steering wheel is moved to the probable contact position in response to a takeover intention being detected based on the position of the hands of the driver and/or the direction of movement of the hands of the driver.

16. The transportation vehicle of claim 9, wherein the movement of the steering wheel is stopped when touched by the driver.

\* \* \* \* \*